G. F. OUTTEN.
Mortising Machines.

No. 137,950.   Patented April 15, 1873.

Witnesses:
Edwin James.
K. V. Gordon.

Inventor:
George F. Outten.
per J. E. J. Holmead
Attorney.

UNITED STATES PATENT OFFICE.

GEORGE F. OUTTEN, OF NORFOLK, VIRGINIA.

IMPROVEMENT IN MORTISING-MACHINES.

Specification forming part of Letters Patent No. 137,950, dated April 15, 1873; application filed March 18, 1873.

*To all whom it may concern:*

Be it known that I, GEORGE F. OUTTEN, of the city and county of Norfolk and State of Virginia, have invented certain new and useful Improvements in Mortising-Machines, of which the following is a full, clear, and exact description, reference being had to the accompanying drawing and the letters of reference marked thereon making part of this specification, in which—

Figure 1:
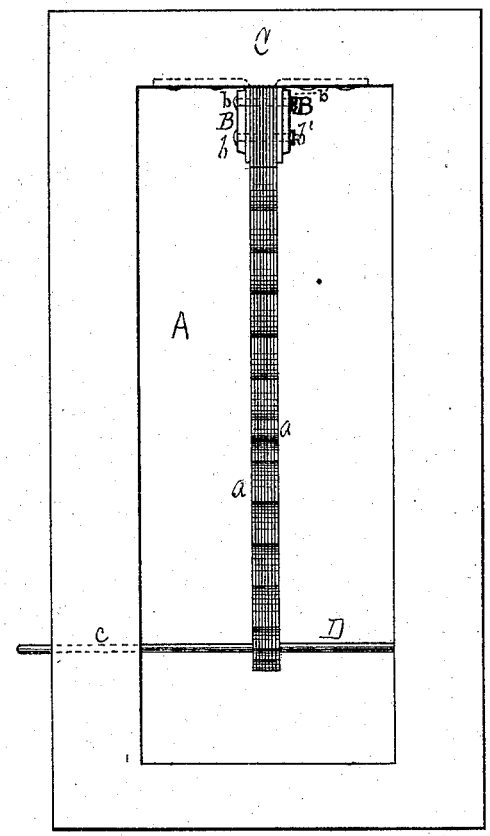
Figure 2:
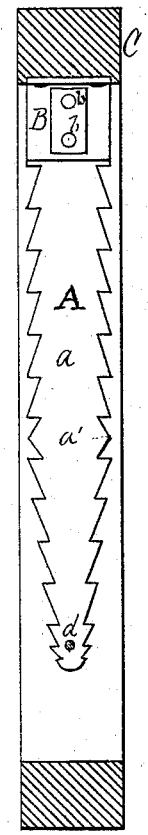

Figure 1 is a top-plan view. Fig. 2 is a longitudinal sectional view.

The nature of my invention consists in constructing the mortising tool or chisel of a series of thin steel plates, which are so serrated as to leave numerous teeth or cutting-points on the outer edges of each blade or plate, the whole being so constructed and arranged as to be adjustable at pleasure, and which permits of the size of the tool being so regulated as to cut a straight rectangular mortise of any desired dimensions.

The construction and operation of my invention are as follows:

A is the mortising tool or chisel, and consists of a series of thin steel plates, $a\ a$. From the middle, $a'$, to the point these plates are of a tapering form, and the edges of each plate are serrated, as clearly shown in Fig. 2. These serrations not only greatly multiply the extent of the cutting-surface of the tool, but also permit of it doing its work with the greatest rapidity, for, as it is operated with a plunging or rising-and-falling movement, the entire extent of the serrated edges of the plates $a\ a$ are utilized, thus securing the advantages of a downward, forward, and rear cut at one and the same time. These plates $a\ a$ are secured in suitable bearings, B B, attached to the plunger-frame C by means of detachable bolts $b\ b$ and nuts $b'\ b'$. These plates may be of any desired dimensions, and so multiplied as to form a tool or chisel of any desired size. Supposing they are one-eighth of an inch thick, as nine of them are shown in Fig. 1, the tool, as therein arranged, is set to cut a mortise of an inch and one-eighth in width.

If, instead of a mortise of this size, you desire to cut a mortise, say, of half an inch, you have simply to undo the nuts $b'\ b'$, and remove from the bolts $b\ b$ five of the plates; and in like manner the size of the tool may be increased or diminished, at pleasure. At the center, and near the point of each plate $a$, is an opening, $d$, through which passes the brace-rod D, which slides and rests in suitable horizontal bearings or orifices, $c\ c$, cut through the vertical sides of the frame C.

In manufacturing these plates care must be taken that the teeth of the serrated edges, as well as the openings $d\ d$, are so formed that when the plates are brought together they shall, at all these points, exactly register, so that in operation, no matter how many of the plates $a\ a$ may be used, the tool shall work as if formed of a single piece of metal.

From the foregoing description, the operation of the improved chisel or tool will readily be understood. Of course it is to be used in connection with a table or platform that supports the timber or board to be cut, and in which there is an opening of sufficient size to allow of the passage of the tool. The frame carrying the tool may be operated by hand or by a plunger-rod, and which may be driven by any suitable motor. The plates $a\ a$ having been set and secured so as to represent a chisel of the size of the mortise which it is desired to cut, you then, with an auger or other suitable instrument, bore a hole in the board or timber, and at the center of the space through which the mortise is to be cut; withdraw the rod D, and then insert the point of the tool in the hole in the timber, giving two or three plunges or risings of the blades. After the hole has been cut the width of the saws, insert the rod D, which braces the blades and permits the tool to work as does the upright saw.

What I claim as new, and desire to secure by Letters Patent of the United States, is—

The adjustable mortising-tool A, consisting of a series of blades, $a\ a$, serrated at each of their edges, and tapering in form from the middle, when the same are so constructed, arranged, and secured as to operate substantially as described.

In testimony whereof I have signed my name to this specification in the presence of two subscribing witnesses.

GEORGE FRANKLIN OUTTEN.

Witnesses:
J. F. WELBORN,
N. H. CHRISTIAN.